United States Patent Office 3,773,823
Patented Nov. 20, 1973

3,773,823
ESTERS OF 5-OXAALKENOIC ACIDS
Vaclav Jarolim, Karel Slama, and Frantisek Sorm, Prague,
Czechoslovakia, assignors to Ceskoslovenska Akademie
Ved, Prague, Czechoslovakia
No Drawing. Filed Apr. 15, 1971, Ser. No. 134,461
Claims priority, application Czechoslovakia, May 5,
1970, 3,119/70, 3,120/70, 3,121/70
Int. Cl. C07c 69/66
U.S. Cl. 260—484 R            13 Claims

ABSTRACT OF THE DISCLOSURE

Esters of 5-oxaalkenoic acids containing in the chain 12–17 carbon atoms, substituted at positions 3, 7 and 11 by an alkyl, alkylidene or alkenyl group, containing a double bond between the carbon atoms C–2,3 and/or C–11, 12 or C–12,13 and/or containing halo atoms of epoxide bridges instead of double bonds, represent substances having insect juvenile hormone activity, i.e., interfere in the insect development.

---

Recently, numerous substances of the insect juvenile hormone activity have been discovered; the activity includes stimulation of the larval development, interference in the larval metamorphosis and maturing of eggs in adult females. The following substances may serve as an example in this respect: methyl 10,11-epoxyfarnesoate [Bowers W. S., Thompson M. J., Uebel E. C.: Life Sciences 4, 2323 (1965), esters of dihydrodichlorofarnesoic acid (Romaňuk M., Sláma K., Sorm F.: Proc. Nat. Acad. Sci. U.S. 57, 349 (1967), the juvenile hormone (Röller H., Dahm K. H.: Recent Progr. Horm. Res. 24, 651 (1968) and derivatives of p-(1,6-dimethylhexyl(benzoic acid (Sláma K., Suchý M., Sorm F.: Biol. Bull. 134, 154 (1968)].

Substances the preparation and use of which is described herein, represent novel analogs of the insect juvenile hormones and show a strong activity on some insect groups hitherto resistant to the known analogs of the insect juvenile hormone. More particularly, the present invention relates to novel esters of 5-oxaalkenoic acids according to Formula I:

wherein,

B is one of the groups:

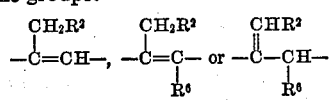

A is one of the groups:

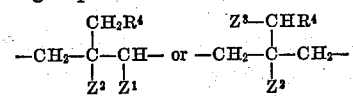

R¹ is hydrogen, lower alkyl, lower alkenyl, cycloalkyl or aralkyl;
each of R², R³, R⁴, R⁵ and R⁶ is hydrogen, lower alkyl of one to five carbon atoms or lower alkylidene of one to five carbon atoms;
Z¹ is hydrogen and Z² is hydrogen, bromo, chloro, fluoro or, taken together with Z¹, a carbon-carbon bond or oxido; and
Z³ is hydrogen or, taken together with Z², a carbon-carbon bond or oxido.

The term "cycloalkyl," as used herein, refers to a cyclic alkyl group of four to eight carbon atoms. The term "aralkyl" refers to a monovalent group in which an aryl group is substituted for a hydrogen atom of an alkyl group, such as benzyl, xylyl, mesityl, phenylethyl, methylbenzyl, naphthylmethyl and naphthylethyl.

The term "lower alkyl," as used herein, refers to a straight or branched chain saturated aliphatic hydrocarbon group having a chain length of one to six carbon atoms. The term "lower alkenyl," as used herein, refers to an ethylenically unsaturated hydrocarbon group, branched or straight chain, having a chain length of two to six carbon atoms.

The compounds of Formula I are useful for the control of insects. The compounds are applied using either liquid or solid carriers, such as water, acetone, cottonseed oil, xylene, mineral oil, silicon, talc, natural and synthetic resins, and the like. Generally, compositions for application will contain up to about 75% of the active compound and more usually less than 25%, sufficient composition should be applied to provide from about 0.1 to 25 micrograms of the active compound per insect. Typical insects controlled by the present invention are Diptera, such as mosquitos and houseflies; Hemiptera, such as Pyrrhocoridae and Miridae; and Coleoptera. For example, *Pyrrhocoris spterus*, *Lygus hesperus*, *Triboleum confusm*, *Diabrotica duodecimpunctata*, *Aedes aegypti* and *Musca domestica*. Without any intention of being bound by theory, the compounds of Formula I are believed to be effective by reason of hormonal action in that unlike conventional insecticides which are effective by reason of causing immediate death, the compounds of Formula I are effective by reason of physiological changes caused in the treated insect which result in eventual death of the insect and/or inability of the treated insect to reproduce by reason of sterility or abnormal development.

The numbering of carbon atoms in the chain is illustrated by the Formula II of ethyl 5-oxa-3,7,11-trimethyl-2,10-dodecadien-1-oate.

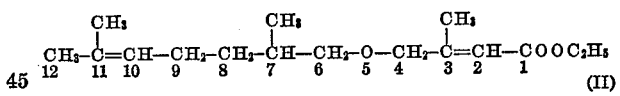

(II)

Furthermore, the present invention relates also to a process of preparing esters of 5-oxaalkenoic acids as well as their isomers and intermediates according to the general Formula I (the symbols [A], R¹⁻⁶ and Z¹⁻³ designate the same as above), which process comprises treatment of the acyl chloride (III) with diazomethane, thereby forming the diazoketone (IV), subjecting the latter to an acid-catalyzed rearrangement, e.g., with boron trifluoride as catalyst, in the presence of an excess of the alcohol (V) consisting of a suitable number of carbon atoms, thereby forming the keto ether (VI) [Newman and Beal, J. Am. Chem. Soc. 72, 5161 (1950)], treating the latter with an alkoxycarbonylmethylenetriphenylphosphorane (with Wittig reaction), thereby forming the required ester of 5-oxaalkenoic acid (I), which is separated into the individual cis- and trans-isomers or, the terminal bond of which is subjected to addition of a hydrogen halide or to epoxidation, thereby forming an ester of the corresponding halo- or epoxy-5-oxaalken- or alken-1-oic acid.

A process of preparing novel esters according to the Formula I is illustrated by the following scheme:

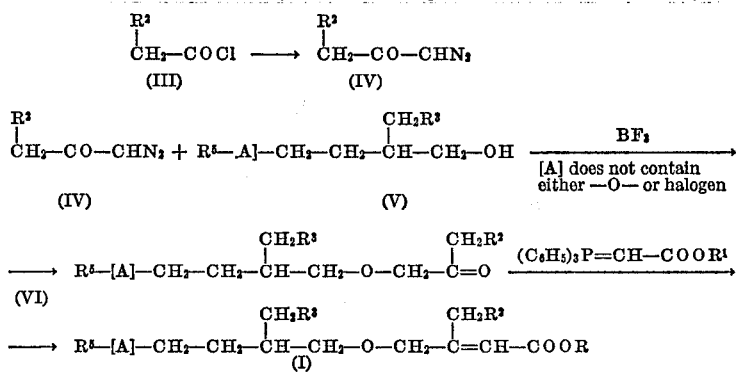

The steps of the above process of preparing novel substances according to the invention are advantageously performed under the following reaction conditions:

(1) The alkoxycarbonylmethylenetriphenylphosphorane reaction is performed in an inert solvent (preferably in benzene or toluene), in an inert atmosphere (nitrogen), and in the presence of a catalyst (preferably benzoic acid); cf. Rüchardt Ch., Eichler S., Panse P.: Ang. Chem. 75, 858 (1963).

(2) The addition of a hydrogen halide to the terminal double bond of esters of 5-oxaalkenoic acids (I) is performed in an inert solvent, preferably in ether, methanol or ethanol.

(3) The epoxidation of the terminal double bond of the substance I is performed preferably in ether or chloroform by the action of organic peracids, namely—perbenzoic acid, perphthalic acid or m-chloroperbenzoic acid.

(4) The separation of the resulting mixtures of cis- and trans-isomers is performed by distillation or adsorption chromatography on silica gel or gas chromatography or by combination of these methods.

In another embodiment, the keto ether (VI) is subjected to reaction with dialkyl esters of an alkoxycarbonylmethanephosphoric acid [Azerad R., Cyrot M. O.: Bull. Soc. Chem. France, 12, 3740 (1965); Janovskaja L. A., Kučerov V. F.: Izv. Akad. Nauk SSSR Chim. Ser. 7, 1341 (1964)], thereby forming the corresponding ester of 5-oxaalkenoic acid (I) which is separated into the individual isomers or converted to the corresponding halo or epoxy derivative.

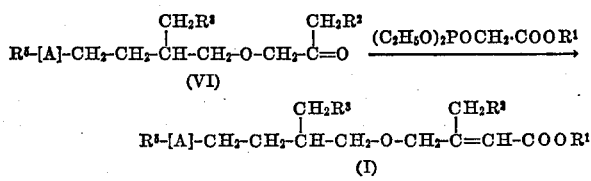

The reaction of keto ethers with esters of an alkoxycarbonylmethanephosphonic acid is performed in an organic solvent, such as dimethylformamide or dimethylcellosolve in an inert atmosphere, e.g., nitrogen, with the use of alkoxides as the base (preferably sodium methoxide) or hydrides (sodium hydride). The separation of mixtures of cis- and trans-isomers is performed by distillation or adsorption chromatography on silica gel or gas chromatography or combination of these methods.

In another embodiment, the keto ether (VI) is reacted (Reformatsky reaction) with an ester of an α-halo carboxylic acid consisting of 2-4 carbon atoms in the presence of zinc, thereby forming the β-hydroxy ester (VII) and subjecting the latter to a dehydration, thereby forming the required ester of 5-oxaalkenoic acid (I) which is separated into the individual isomers or converted to the corresponding halo derivative or transformed to the epoxy derivative.

This novel process of preparing esters according to the Formula I is illustrated by the following scheme:

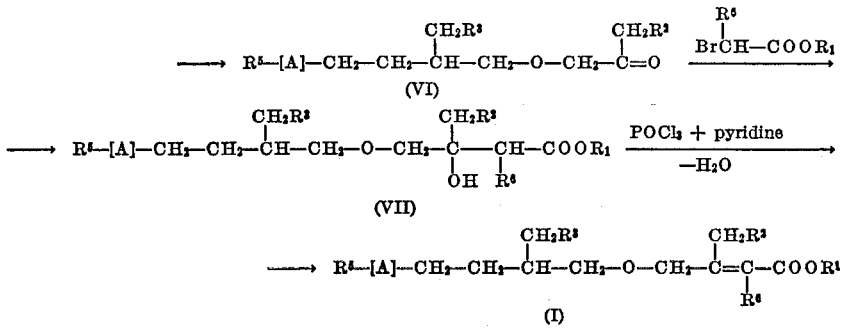

In the above scheme, the symbol [A] designates the same as in Formula I but does not contain either —O— or the halo atom.

The above process of preparing compounds according to Formula I is performed preferably under the following reaction conditions: (1) The Reformatsky reaction is performed in inert solvents (esters, hydrocarbons), preferably in benzene or toluene; (2) The dehydration of β-hydroxy esters (VII) is performed with usual dehydrating agents, preferably phosphorus oxychloride in pyridine. Cis and trans isomers can be separated as described before.

The following examples are provided to illustrate the present invention. Temperature in degrees centigrade.

EXAMPLE 1

Preparation of 4-oxa-6,10-dimethyl-9-undecen-2-one

Acetyl chloride (3.9 g.; 0.05 mol) in absolute ether (10 ml.) is added dropwise under stirring into precooled (—15°) ethereal diazomethane (6.3 g.; 0.15 mol). The mixture is allowed to stand for about 1 hour (a spontaneous rise of temperature to 0°). The ether is evaporated at 0° in vacuo. The residual diazo ketone is dissolved in 2,6-dimethyl-5-hepten-1-ol (14.2 g.; 0.1 mol), the resulting reaction mixture cooled with water, treated with boron trifluoride etherate (0.2 ml.), and thoroughly mixed (evalution of nitrogen and rise of temperature). The reaction is finished when the evolution of gas ceases.

The reaction mixture is diluted with ether (100 ml.), washed with an aqueous solution of sodium bicarbonate and water until neutral, and evaporated. The residue is fractionated to afford the crude keto ether, B.P. 130–140° C./10 mm. HG, which is purified by chromatography on silica gel with the use of petroleum ether-ether (9:1) as eluant. Yield, 3.2 g. of pure 4-oxa-6,10-dimethyl-9-undecen-2-one.

Preparation of ethyl 5-oxa-3,7,11-trimethyl-2,10-dodecadien-1-oate II

A mixture of 4-oxa-6,10-dimethyl-9-undecen-2-one (1.98 g.; 0.01 mol), ethoxycarbonylmethylenetriphenylphosphorane (4.2 g.; 0.012 mol), benzoic acid (0.3 g), and absolute benzene (30 ml.) is gently refluxed for 8 hours in atmosphere of dry nitrogen under exclusion of atmospheric moisture. The benzene is evaporated and the residue is extracted with four 25-ml. portions of petroleum ether. The extracts are combined, washed with 2% aqueous sulfuric acid, aqueous sodium bicarbonate and water until neutral, and evaporated. Distillation of the crude residue at 110–115° C./0.01 mm. Hg affords a mixture of ethyl esters of cis- and trans-5-oxa-3,7,11-trimethyl-2,10-dodecadien-1-oic acid (2.0 g.); this mixture may be purified or separated into individual isomers by chromatography on silica gel or by gas chromatography. The structure of the product was confirmed by infrared spectroscopy and NMR spectroscopy.

EXAMPLE 2

Preparation of 5-oxa-7,11-dimethyl-10-dodecen-3-one

Diazomethane (6.3 g.), proionyl chloride (4.6 g.), and 2,6-dimethyl-5-hepten-1-ol (14.2 g) are processed in analogy to Example 1 to afford 5-oxa-7,11-dimethyl-10-dodecen-3-one (3.6 g.) and then ethyl 5-oxo-3-ethyl-7,11-dimethyl-2,10-dodecadien-1-oate.

EXAMPLE 3

Preparation of ethyl 5-oxa-3,11-dimethyl-7-ethyl-2,10-tridecadien-1-oate 4-oxa-10-methyl-6-ethyl-9-dodecan-2-one (2.25 g.), ethoxycarbonylmethylenetriphenylphosphorane (4.2 g.), benzoic acid (0.3 g.), and absolute benzene (30 ml.) are processed in analogy to Example 1 to afford a mixture of ethyl cis- and trans 5-oxa-3,11-dimethyl-7-ethyl-2,10-tridecadien-1-oate, B.P. 120–125° C./0 mm. Hg.

EXAMPLE 4

Preparation of ethyl 5-oxa-3,7,11-trimethyl-2,10-dodecadien-1-oate (200 mg.; prepared according to Example 1) in ethanol (3 ml.) is saturated under cooling with dry gaseous hydrogen chloride. The resulting reaction mixture is processed according to (A) or (B).

(A) The mixture is poured onto ice, extracted with ether, the extract washed with an aqueous solution of sodium bicarbonate and water until neutral, dried, and the ether is evaporated at room temperature in vacuo.

(B) To remove ethanol, the reaction mixture is evaporated at room temperature in vacuo.

The residual ethyl 5-oxa-3,7,11-trimethyl-11-chloro-2-dodecen-1-oate (200 mg.) is pure enough and does not require any further purification. Its structure was confirmed by elemental analysis and infrared spectroscopy.

EXAMPLE 5

Preparation of ethyl 5-oxa-3,7,11-trimethyl-10,11-epoxy-2-dodecen-1-oate

A solution of ethyl 5-oxa-3,7,11,-trimethyl-2,10-dodecadien-1-oate (100 mg.; obtained according to Example 1) in ether (3 ml.) is treated with ethereal perphthalic acid (10 mg.) and the resulting mixture is allowed to stand in an ice-box for 3 days. The precipitate of phthalic acid is filtered off, the filtrate washed with an aqueous solution of sodium bicarbonate and water, and evaporated. The residual epoxy derivative (100 mg.) is sufficiently pure but may be further purified by chromatography on silica gel with the use of petroleum ether-ether (9:1) as eluant and distillation at 120–125° C./0.01 mm. Hg. The structure of the epoxy derivative was confirmed by elemental analysis and infrared spectroscopy.

EXAMPLE 6

Preparation of benzyl 5-oxa-3,7,11-trimethyl-2,10-dodecadien-1-oate

A solution of 5-oxa-3,7,11-trimethyl-2,10-dodecadien-1-oic acid (150 mg.; obtained by saponification of its ethyl ester, cf. Example 1, with 1% alcoholic potassium hydroxide and isolation of the acidic portion) in benzene (5 ml.) is treated with thionyl chloride (0.5 ml.) and the whole allowed to stand at room temperature for 4–5 hours. The benzene and remaining thionyl chloride are removed by distillation. The residual crude carbonyl chloride is dissolved in absolute benzene (5 ml.) and the solution is treated with benzyl alcohol (1 ml.). The mixture is allowed to stand at 20° for 1 hour and then refluxed for 30 minutes, diluted with ether, washed with an aqueous solution of sodium bicarbonate and water, and evaporated. The residue is separated into components by chromatography on silica gel with the use of petroleum ether-ether (9:1) as eluant. The first fractions of the eluate contain the required benzyl 5-oxa-3,7,11-trimethyl-2,10-dodecadien-1-oate (110 mg.), B.P. 150–155° C./0.01 mm. Hg.

EXAMPLE 7

The following ether ketones of Formula VI are prepared following the process of Example 1 which can be converted into the respective 5-oxaalkenoic acids and esters and the halogenated and epoxide derivatives thereof.

4-oxa-6,10-dimethylundecan-2-one, 4-oxa-6,10-dimethyldodecan-2-one, 4-oxa-6,10-dimethyl-9-dodecen-2-one, 4-oxa - 6,10 - dimethyl-10-dodecen-2-one, 4-oxa-6-ethyl-10-methyldodecan-2-one, 4-oxa-6-ethyl-10-methyl-9-dodecen-2-one, 5-oxa-7,11-dimethyldodecan-2-one, 4-oxa-6,10-14-trimethyl-13-pentadecen-2-one, 4-oxa-6,10,14-trimethyl-9,13-pentadecadien-2-one, 4-oxa-6,10,14-trimethyl-7,9,13-pentadecatrien-2-one.

EXAMPLE 8

Preparation of methyl 5-oxa-3,7,11-trimethyl-2,10-dodecadien-1-oate

A solution of diethyl methoxycarbonylmethanephosphonate (2.1 g.; 0.01 mol) in dimethylformamide (20 ml.) is treated dropwise under stirring at room temperature with methanolic sodium methoxide (obtained from 3 ml. of absolute methanol and 0.23 g., i.e., 0.01 gram atom, of metallic sodium) and the mixture is stirred in a nitrogen atmosphere for 1 hour. A solution of 4-oxa-6,10-dimethyl-9-undecen-2-one (1.98 g.; 0.01 mol) in dimethylformamide (3 ml.) is then added dropwise at temperature not exceeding 30°. When the spontaneous reaction is finished, the mixture is heated at 70–80° for 6 hours, poured onto ice, moderately acidified with acetic acid, and extracted with ether. The extract is washed with an aqueous solution of sodium bicarbonate and water until neutral, evaporated, and the crude residue distilled at 105–110° C./0.01 mm. Hg. Yield, 2.1 g. of a mixture of methyl cis- and trans-5-oxa-3,7,11-trimethyl-2,10-dodecadien-1-oate which may be purified or separated into the individual isomers by chromatography on silica gel or gas chromatography. The structure of the substance was confirmed by infrared spectroscopy.

EXAMPLE 9

Preparation of methyl 5-oxa-3,7,11-trimethyl-2-dodecen-1-oate

A suspension of sodium hydride (0.24 g.; 0.01 mol) in dimethyl Cellosolve (20 ml.) is treated dropwise under exclusion of moisture and stirring in an inert atmosphere with diethyl methoxycarbonylmethanephosphonate (2.1 g.; 0.01 mol). When the spontaneous reaction is finished, the mixture is stirred for an additional 1 hour and treated dropwise at temperature not exceeding 30° with 4-oxa-6,10-dimethylundecen-2-one (2.0 g.; 0.01 mol; prepared in analogy to Example 1). The mixture is allowed to stand for 1 hour and then heated at 70–80° for 5–7 hours. The content of the flask is poured onto ice, moderately acidified with acetic acid, and extracted with ether. The extract is washed with an aqueous solution of sodium bicarbonate and water, and the solvent is evaporated. The crude residue is distilled at 104–109° C./0.01 mm. Hg. Yield, 2.1 g. of a mixture of methyl cis- and trans-5-oxa-3,7,11-trimethyl-2-dodecen-1-oate which may be purified or separated by chromatography on silica gel or gas chromatography. The structure of the substance was confirmed by infrared spectroscopy.

EXAMPLE 10

Preparation of ethyl 5-oxa-3,7,11-trimethyl-2,10-dodecadien-1-oate

A solution of 4-oxa-6,10-dimethyl-9-undecen-2-one (3.96 g.; 0.02 mol) and ethyl bromoacetate (3.67 g.; 0.022 mol) in absolute benzene (10 ml.) is added dropwise to a suspension of activated powdered zinc (1.31 g.; 0.02 mol) in absolute benzene at such a rate to keep a moderate reaction. The mixture is then refluxed until all zinc dissolves, poured onto ice, acidified with dilute aqueous sulfuric acid, and extracted with ether. The ethereal extract is washed with water, dried, and evaporated to afford the crude β-hydroxy ester (5.0 g.) which is dehydrated by dropwise addition into a mixture of phosphorus oxychloride (3.3 g.), absolute pyridine (15 ml.), and absolute benzene (20 ml.). The resulting mixture is heated at 70–90° for 1.5 hours, poured onto ice, and extracted with ether. The ethereal extract is washed with 5% aqueous sulfuric acid, aqueous sodium bicarbonate, and water, and evaporated. The residual crude ester is distilled at 109–114° C./0.01 m. Hg to afford a mixture of isomeric ethyl esters of cis- and trans-5-oxa-3,7,11-trimethyl-2,10-dodecadien-1-oic acid (2.5 g.) which is purified or separated by chromatography on silica gel, or gas chromatography.

EXAMPLE 11

Using the procedures of Examples 1–6 and 8–10, other keto ethers of Formula VI, see Example 7 for example, are converted into the acids and esters and halogenated and epoxides derivatives thereof to prepare the following novel compounds of Formula I.

5-oxa - 3,7,11-trimethyl - 2 - dodecen-1-oic acid, methyl 5-oxa-3,7,11-trimethyl - 2 - dodecene - 1 - oate, ethyl 5-oxa-3,7,11-trimethyl-2 - dodecene - 1 - oate, benzyl 5-oxa-3,7,11-trimethyl-2-dodecene-1 - oate, cyclohexyl 5-oxa-3,7,11-trimethyl-2-dodecen-1-oate and allyl 5 - oxa-3,7,11-trimethyl-2-dodecen-1-oate;

5-oxa-3,7,11-trimethyl - 2,10 - dodecadien - 1 - oic acid, methyl 5-oxa-3,7,11-trimethyl - 2,10 - dodecadien - 1-oate, cyclohexyl 5-oxa-3,7,11-trimethyl - 2,10 - dodecadien-1-oate and allyl 5-oxa-3,7,11-trimethyl - 2,10 - dodecadien-1-oate;

5-oxa-3,7,11-trimethyl-10,11-epoxy - 2 - dodecen - 1 - oic acid, methyl 5-oxa-3,7,11-trimethyl - 10,11 - epoxy - 2-dodecen-1-oate and benzyl 5-oxa-3,7,11-trimethyl-10,11-epoxy-2-dodecen-1-oate;

5-oxa-3,7-11-trimethyl-11 - chloro - 2 - dodecen - 1 - oic acid, methyl 5-oxa-3,7,11-trimethyl-11-chloro - 2 - dodecen-1-oate, and benzyl 5-oxa-3,7,11 - trimethyl - 11 - chloro-2-dodecen-1-oate;

5-oxa-3,7,11-trimethyl-2-tridecen-1-oic acid, methyl 5-oxa-3,7,11-trimethyl-2-tridecen-1-oate, ethyl 5-oxa-3,7,11-trimethyl-2-tridecen-1-oate and benzyl 5-oxa-3,7,11-trimethyl-2-tridecen-1-oate;

5-oxa-3,7,11-trimethyl-2,10-tridecadien-1-oic acid, methyl 5-oxa-3,7,11-trimethyl-2,10-tridecadien-1-oate, ethyl 5-oxa-3,7,11-trimethyl-2,10-tridecadien-1-oate and benzyl 5-oxa-3,7,11-trimethyl-2,10-tridecadien-1-oate;

5-oxa-3,7,11-trimethyl-10,11-epoxy-2 - tridecen - 1 - oate, methyl 5-oxa-3,7,11-trimethyl-10-epoxy-2-tridecen - 1-oate, ethyl 5-oxa-3,7,11-trimethyl-10,11-epoxy - 2 - tridecen-1-oate and benzyl 5-oxa-3,7,11-trimethyl - 10,11-epoxy-2-tridecen-oate;

5-oxa-3,7,11-trimethyl-11-chloro-2-tridecen - 1 - oic acid, methyl 5-oxa-3,7,11-trimethyl-11-chloro-2-tridecen - 1-oate, ethyl 5-oxa-3,7,11-trimethyl-11-chloro-2-tridecen-1-oate and benzyl 5-oxa-3,7,11-trimethyl-11-chloro-2-tridecen-1-oate;

5-oxa-3,7,11-trimethyl-2,11-tridecadien-1-oic acid, methyl 5-oxa-3,7,11-trimethyl-2,11-tridecadien-1-oate and ethyl 5-oxa-3,7,11-trimethyl-2,11-tridecadien-1-oate;

5-oxa-3,7,11-trimethyl-11,12-epoxy-2-tridecen-1 - oic acid, methyl 5-oxa-3,7,11-trimethyl-11,12-epoxy-2-tridecen-1-oate and ethyl 5-oxa-3,7,11-trimethyl-11,12-epoxy-2-tridecen-1-oate;

5-oxa-3,11-dimethyl-7-ethyl-2-tridecen-1-oic acid, methyl 5-oxa-3,11-dimethyl-7-ethyl-2-tridecen-1-oate and ethyl 5-oxa-3,11-dmethyl-7-ethyl-2-tridecen-1-oate;

5-oxa-3,11-dimethyl-7-ethyl-2,10-tridecadien - 1 - oic acid and methyl 5-oxa-3,11-dimethyl-7-ethyl - 2,10 - tridecadien-1-oate;

5-oxa-3,11-dimethyl-7-ethyl-10,11-epoxy-2-tridecen-1 - oic acid, methyl 5-oxa-3,11-dimethyl-7-ethyl-10,11-epoxy-2-tridecen-1-oate and ethyl 5-oxa-3,11-dimethyl-7-ethyl-10,11-epoxy-2-tridecen-1-oate;

5-oxa-3-ethyl-7,11-dimethyl-2-dodecen-1-oic acid, methyl 5-oxa-3-ethyl-7,11-dimethyl-2-dodecen-1-oate, ethyl 5-oxa-3-ethyl-7,11-dimethyl-2-dodecen-1-oate and benzyl 5-oxa-3-ethyl-7,11-dimethyl-2-dodecen-1-oate;

5-oxa-3-ethyl-7,11-dimethyl-2,10-dodecadien-1 - oic acid, methyl 5-oxa-3-ethyl-7,11-dimethyl-2,10-dodecadien-1-oate and benzyl 5-oxa-3-ethyl-7,11-dimethyl-2,-10-dodecadien-1-oate;

5-oxa-3-ethyl-7,11-dimethyl-11-chloro - 2 - dodecen-1-oic acid, methyl 5-oxa-3-ethyl-7,11-dimethyl-11-chloro-2-dodecen-1-oate, ethyl 5-oxa-3-ethyl-7,11 - dimethyl-11-chloro-2-dodecen-1-oate and benzyl 5-oxa-3-ethyl-7,11-dimethyl-11-chloro-2-dodecen-1-oate;

5-oxa-3-ethyl-7,11-dimethyl-10,11-epoxy-2-dodecen - 1 - oic acid, methyl 5-oxa-3-ethyl-7,11-dimethyl-10,11-epoxy-2-dodecen-1-oate, ethyl 5-oxa-3-ethyl - 7,11 - dimethyl-10,11-epoxy-2-dodecen-1-oate and benzyl 5-oxa-3-ethyl-7,11-dimethyl-10,11-epoxy-2-dodecen-1-oate;

5-oxa-3,7,11,15-tetramethyl-2,14-hexadecadien-1-oic acid, methyl 5-oxa-3,7,11,15-tetramethyl-2,14-hexadecadien-1-oate and ethyl 5-oxa-3,7,11-15-tetramethyl-2,14-hexadecadien-1-oate;

5-oxa-3,7,11,15-tetramethyl-14,15-epoxy-2 - hexadecen-1-oic acid, methyl 5-oxa-3,7,11,-15 - tetramethyl - 14,15-epoxy-2-hexadecen-1-oate and ethyl 5 - oxa - 3,7,11,15-tetramethyl-14,15-epoxy-2-hexadecen-1-oate;

5-oxa-3,7,11,15-tetramethyl-15-chloro-2-hexadecen-1 - oic acid, methyl 5-oxa-3,7,11,15-tetramethyl-15 - chloro - 2-hexadecen-1-oate and ethyl 5-oxa-3,7,11,15-tetramethyl-15-chloro-2-hexadecen-1-oate;

5-oxa-3,7,11,15-tetramethyl-2,10,14-hexadecatrien-1 - oic acid, methyl 5-oxa-3,7,11,15-tetramethyl-2,10,14 - hexadecatrien-1-oate and ethyl 5-oxa-3,7,11,15-tetramethyl-2,10,14-hexadecatrien-1-oate;

5-oxa-3,7,11,15-tetramethyl-14,15-epoxy-2,10 - hexadecadien-1-oic acid, methyl 5-oxa-3,7,11,15-tetramethyl-14,15-epoxy-2,10-hexadecadien-1-oate and ethyl 5-oxa-3,7,11,15-tetramethyl-14,15-epoxy-2,10 - hexadecadien - 1-oate;

5-oxa-3,7,11,15-tetramethyl-11,15-dichloro-2 - hexadecen-1-oic acid, methyl 5-oxa-3,7,11,15-tetramethyl-11,15-dichloro-2-hexadecen-1-oate and ethyl 5-oxa-3,7,11,15-tetramethyl-11,15-dichloro-2-hexadecen-1-oate;

5-oxa-3,7,11,15-tetramethyl-2,8,10,14-hexadecatetraen-1-oic acid, methyl 5-oxa-3,7,11-15-tetramethyl-2,8,10,14-hexadecatetraen-1-oate and ethyl 5-oxa-3,7,11,15-tetramethyl-2,8,10,14-hexadecatetraen-1-oate;

5-oxa-3,7,11,15-tetramethyl-14,15 - epoxy - 2,8,10 - hexadecatrien-1-oic acid, methyl 5-oxa-3,7,11,15-tetramethyl-14,15-epoxy-2,8,10-hexadecatrien-1-oate and ethyl 5-oxa-3,7,11,15-tetramethyl-14,15-epoxy - 2,8,10 - hexadecatrien-1-oate; and 5-oxa-3,11-dimethyl-7-ethyl-11-chloro-2-tridecen - 1 - oic acid, methyl 5-oxa-3,11-dimethyl-7-ethyl-11-chloro-2-tridecen-1-oate and ethyl 5-oxa-3,11-dimethyl-7-ethyl-11-chloro-2-tridecen-1-oate.

Biological tests and the insect juvenile hormone activity of derivatives of 5-oxa-3,7,11-trimethyl-2,10-dodecadien-1-oic acid: The ethyl ester of 5-oxa-3,7,11-trimethyl-2,10-dodecadien-1-oic acid and particularly the corresponding 10,11-epoxy and 11-chloro derivatives exhibit a high insect juvenile hormone activity. These substances inhibit the insect metamorphosis when applied topically to larvae or pupae in a quantity of about 5 nanograms per specimen; on the other hand, these substances are almost completely inactive on other insect species, i.e., they belong to a group of selective pesticides of a potential use in practice. Furthermore, these substances exhibit considerably strong sterilization effects on adult females of some insect species. Thus, doses of about 1 microgram per female develop a permanent sterilization of these females, namely, their eggs fail to hatch any larvae owing to inhibition of embryonic development.

Methods for testing the insect juvenile hormone activity: Standard tests have been used, i.e., the test substances have been applied topically in 1 microliter of acetone to the body surface of freshly molted last instar larvae as well as applied topically in the same manner or injected into the body of freshly molted pupae in 1 microliter of olive oil.

Evaluation: The insect juvenile hormone activity was evaluated on the basis of the morphological effect on inhibition of the metamorphosis. The activity unit ($ID_{50}$) (half inhibition of morphological processes of metamorphosis) is represented by that amount of the test substance in micrograms which causes formation of half adultoids, half larvae and half imaginal (with Hemiptera) or half pupal adultoids (with bugs) under the above-mentioned test conditions. For numerical data, see Table I.

It may be seen from Table I that some of the test substances exhibit an extraordinary insect juvenile hormone activity and fulfill all requirements for a practical use. The active substances may be used for contamination of the insect localities in the form of suspensions, dustings, aeresols. It is also possible to contaminate similarly the insect or its food. In view of their high activity, the test substances may be used as sexual sterilants since males contaminated with higher doses (about 100 micrograms) contaminate the copulating females thereby causing their permanent sterility. The test substances do not exhibit any toxicity to insect in doses several orders of magnitude higher than the $ID_{50}$ value and are inert against resistant species. Conclusively, the test substances fulfill all requirements for selective ovicides.

TABLE I

| | Pyrrhocoridae | | Pentatomidae | Lygaeidae | Tenebrionidae | | Dermestidae |
|---|---|---|---|---|---|---|---|
| | Pyrrhocoris apterus | Dysdercus cingulatus | Graphosoma italicum | Lygaeus equestris | Tenebrio molitor | | Dermestes vulpinus |
| I | 0.8 | 0.1 | 8 | 8 | 100 | | |
| II | 0.01 | 0.005 | 0.1 | 0.005 | 1,000 | 50 | 1,000 |
| III | 0.005 | 0.008 | 5 | 0.01 | 1,000 | | |
| | Topical | Topical | Topical | Topical | Injected | Topical. Injected | Topical. |

NOTE.—I=Ethyl 5-oxa-3,7,11-trimethyl-2,10-dodecadien-1-oate; II=Ethyl 5-oxa-3,7,11-trimethyl-10,11-oxido-2-dodecen-1-oate; III=Ethyl oxa-3,7,11-trimethyl-11-chloro-2-dodecen-1-oate.

Compound II when applied topically (1 microgram) to adult female Pyrrhocoris caused 50% sterilization. Compound III caused permanent sterilization.

What is claimed is:

1. Compounds selected from the formula

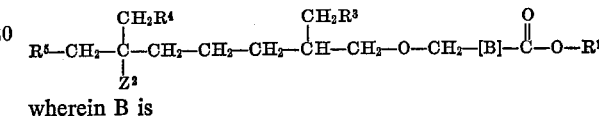

wherein B is

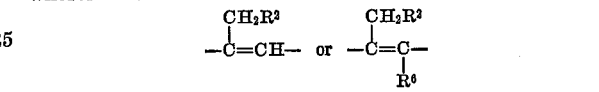

$R^1$ is hydrogen, lower alkyl, lower alkenyl, cycloalkyl or aralkyl;

each of $R^2$, $R^3$, $R^4$, $R^5$ and $R^6$ is hydrogen, lower alkyl of one to five carbon atoms or lower alkylidene of one to five carbon atoms; and $Z^2$ is hydrogen, bromo, chloro or fluoro.

2. A compound according to claim 1 wherein B is the group

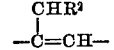

3. A compound according to claim 1 wherein each of $R^2$, $R^3$ and $R^4$ is hydrogen or methyl and $R^5$ is lower alkyl.

4. The compounds, methyl 4-oxa-3,7,11-trimethyl-1,10-dodecadien-1-oate and ethyl 5-oxa-3,7,11-trimethyl-2,10-dodecadien-1-oate, according to claim 1.

5. A compound according to claim 1 wherein $Z^2$ is chloro.

6. A compound according to claim 5 wherein $R^2$ is hydrogen, $R^5$ is hydrogen or methyl and $R^1$ is hydrogen, methyl or ethyl.

7. The compounds, methyl 5-oxa-3,7,11-trimethyl-11-chloro-2-dodecen-1-oate and ethyl 5-oxa-3,7,11-trimethyl-11-chloro-2-dodecen-1-oate, according to claim 6.

8. A compound according to claim 1 wherein $Z^2$ is hydrogen.

9. A compound according to claim 8 wherein $R^2$ is hydrogen, $R^5$ is hydrogen or methyl and $R^1$ is hydrogen, methyl or ethyl.

10. A compound according to claim 1 wherein $R^2$ is hydrogen, $R^5$ is hydrogen or methyl and $R^1$ is hydrogen, methyl or ethyl.

11. A compound according to claim 4 wherein $R^1$ is hydrogen, methyl or ethyl.

12. A compound according to claim 11 wherein $R^1$ is methyl or ethyl.

13. A compound according to claim 1 which is ethyl 5-oxa-3,7,11-trimethyl-11-chloro-2-dodecen-1-oate.

No references cited.

LORAINE A. WEINBERGER, Primary Examiner

P. J. KILLOS, Assistant Examiner

U.S. Cl. X.R.

260—141, 348 A, 408, 410, 410.5, 410.9 R, 413, 535 R, 535 H, 594; 424—312, 314, 317, 318